Feb. 21, 1967 A. L. KADIS 3,305,635

MULTITONE DATA TRANSMISSION SYSTEM WITH DATA BITS COMPRISED OF COMBINATIONS OF DATA TONES AND REST TONES

Filed Feb. 25, 1963 3 Sheets-Sheet 1

INVENTOR.
ALBERT L. KADIS
BY Robert T. Dunn
AGENT

Feb. 21, 1967 A. L. KADIS 3,305,635

MULTITONE DATA TRANSMISSION SYSTEM WITH DATA BITS COMPRISED OF COMBINATIONS OF DATA TONES AND REST TONES

Filed Feb. 25, 1963 3 Sheets-Sheet 2

INVENTOR.
ALBERT L. KADIS

BY Robert T. Dunn

AGENT

INVENTOR.
ALBERT L. KADIS
BY Robert T. Dunn
AGENT

United States Patent Office 3,305,635

Patented Feb. 21, 1967

3,305,635

MULTITONE DATA TRANSMISSION SYSTEM WITH DATA BITS COMPRISED OF COMBINATIONS OF DATA TONES AND REST TONES

Albert L. Kadis, Natick, Mass., assignor to Raytheon Company, Lexington, Mass., a corporation of Delaware

Filed Feb. 25, 1963, Ser. No. 260,712
7 Claims. (Cl. 178—66)

This invention relates to data transmission systems and more particularly to a system for transmitting punch card information over telephone lines.

Data transmission systems in current use transmit combinations of tone signals which represent information punched on a card. These tone signals are transmitted over a telephone line to a receiver which decodes the tone signals to energize a typewriter or display or to punch another set of cards. Heretofore, each bit of data has been represented by the simultaneous transmission of three different data tone signals. When three such signals are received by the receiver and decoded, the data is translated, but, if one or more is missing, no data is translated. It is preferred to employ at least three simultaneous tone signals to represent a single bit of data to provide reliability because it is very unlikely that spurious signals of all three frequencies would likely occur simultaneously to thereby convey a false bit of data to the receiver. It has also been the practice to transmit three rest tones simultaneously during periods when no data is being transmitted. Each of the rest tones saturates one of the receiver amplifiers during the periods when no data is being transmitted, and thus squelches reflections of data tones which may be circulating back and forth in the telephone line. In systems where three different tones represent each bit of data and where three rest tones are employed to saturate three receivers, it has been the practice to employ three oscillators at the transmitter, each connected to a different bank of tuned circuits by a series of switches which are controlled by signals from contacts designed to "feel" the punched holes in a card. Each oscillator might, for example, be coupled to four different tuned circuits, three of which are tuned to data tones, and the fourth to a rest tone. The switches are controlled in such a manner that the rest tone is transmitted when no data tone is called for by the contacts, but when a data tone is called for from the oscillator, the rest tone is turned off. In a system such as this including three oscillators each capable of transmitting three different data tones in a single rest tone and which transmits three data tones for each bit of data, the maximum number of different bits of data that can be transmitted is $3^3$ or 27. The rest tones do not contribute to the amount of data in any manner and serve only to saturate the receiver amplifiers during rest periods. It is one object of the present invention to transmit three tones to represent each bit of data and to transmit rest tones during intervals between data transmission and also to make use of the rest tones so that the total number of bits of data that can be transmitted with a given number of tones available is increased.

In the present invention each bit of data is represented by one or two data tones accompanied by two or one rest tones, respectively, and thus, there are provided three different tones to represent each bit of data, and there are also provided three rest tones during intervals between data transmission. Thus, in a system employing, for example, three oscillators, each capable of transmitting three data tones and one rest tone, the total number of data bits that can be transmitted is increased from 27 to 36 at no sacrifice of reliability or effectiveness of the rest tones to saturate the receiver amplifiers during periods when no data is transmitted.

Other features and objects of the invention will be apparent from the following specific description taken in conjunction with the drawings in which.

Figure 1:
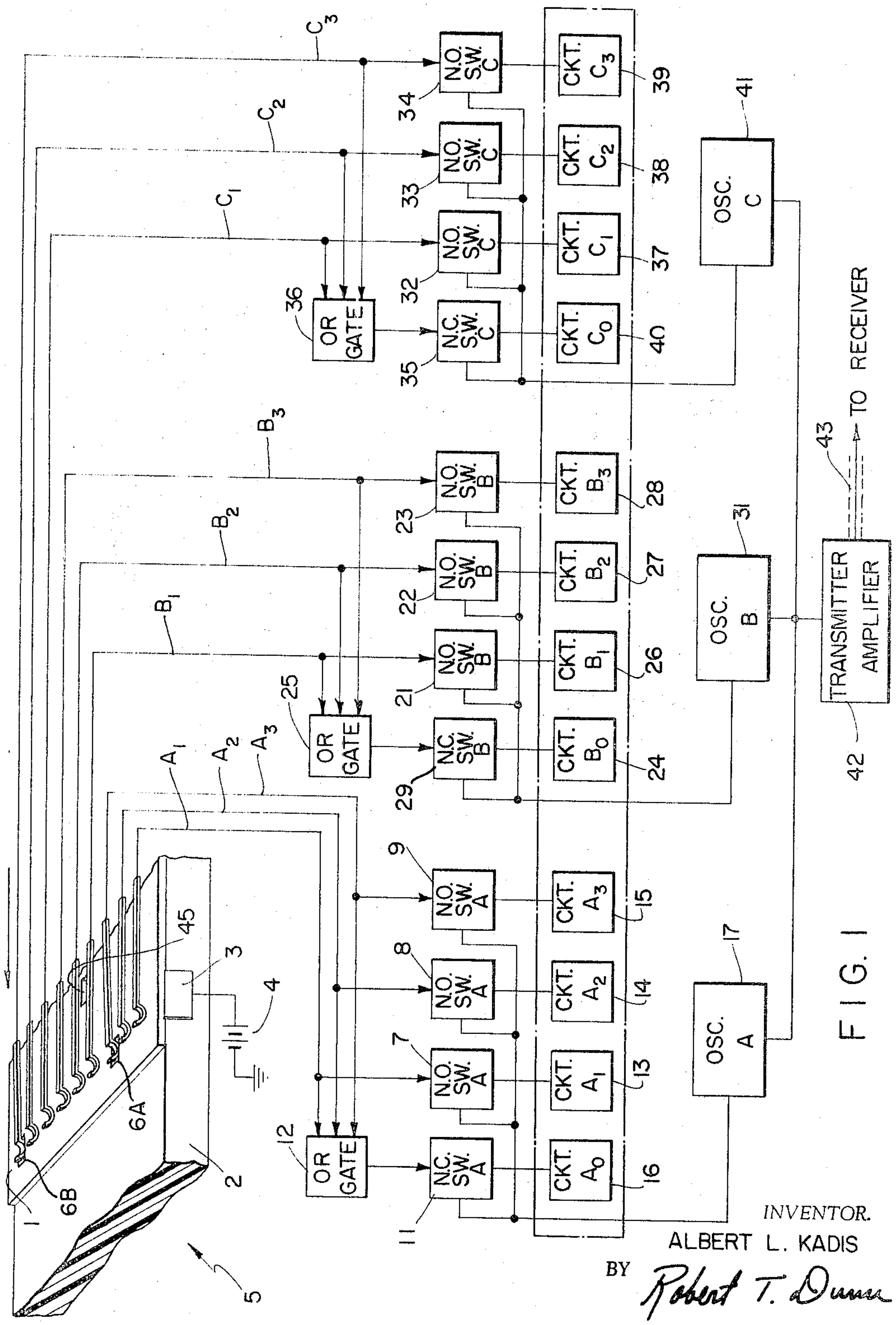
FIG. 1 illustrates transmitter equipment for detecting data punched in a card and including three oscillators for transmitting three tones representative of the data punched in the card.

Turning first to FIG. 1 there is shown one end of a punched card 1 which is preferably moved along a plate 2 in the direction of the arrow and which is composed substantially of insulating material. The plate 2 includes a conductive strip 3 disposed transverse to the motion of the card to which a potential is applied from a source 4. A bank of contacts 5 is mounted so that the contacts, denoted $A_1$ to $A_3$; $B_1$ to $B_3$ and $C_1$ to $C_3$, are firmly held against the card 1 so that when openings such as $6_A$ and $6_B$ in the card move past contacts such as $A_3$ and $C_3$ as shown in the figure, these contacts make connection with the conductive strip 3, and a potential is applied to them from the source 4 generating a pulse in the contacts. The duration of the pulses is determined by the length of the hole in the card and the speed at which the card is moved along the plate 2 by a mechanism which is not shown.

Pulses generated in the above manner in the contacts $A_1$, $A_2$ or $A_3$ are applied to normally open switches $A_1$, $A_2$ or $A_3$, respectively, denoted 7–9 and also to normally closed switch $A_0$, denoted 11, through OR gate 12. Each of the switches 7–9 and 11 serves to connect a different one of the tuned circuits 13–16 to the A oscillator 17.

The contacts $B_1$, $B_2$ and $B_3$ connect to similar normally open switches 21, 22 and 23 and also to a similar nor- switches couple one of the tuned circuits 26–96ᵈa261l–p mally closed switch 24 through an OR gate 25. These switches couple one of the tuned circuits 26–29 to the B oscillator 31. Similarly, pulses generated in contacts $C_1$, $C_2$ and $C_3$ control normally open switches 32–34 and also normally closed switch 35 through OR gate 36, each of these swtiches serving to couple one of the tuned circuits 37–40 to the C oscillator 41.

In operation, the three oscillators 17, 31 and 41 energize a transmitter 42 which transmits the tone signals through a telephone line 43 to three receivers at the other end of the line. FIG. 1 illustrates operation when a bit of data is represented by two holes $6_A$ and $6_B$ in the card. These holes are spaced so that the pulses are generated in the contacts $A_3$ and $C_3$, whereas no such pulse is generated in contacts $B_1$, $B_2$ or $B_3$. As a result, switches 9 and 34 are caused to close, and simultaneously switches 11 and 35 are opened so that oscillator A is coupled only to circuit $A_3$, denoted 15, and oscillator C is coupled only to circuit $C_3$, denoted 39. At the same time, since no pulse is produced in contacts $B_1$, $B_2$ or $B_3$, the switches 21 and 23 remain open and switch 24 remains closed so that oscillator B is coupled to circuit $B_0$ denoted 29. By this action, there are transmitted 2 data tones, $A_3$ and $C_3$ and one rest tone $B_0$. This illustrates how a single data bit may be indicated by two holes in the card to cause three different tones to be transmitted to the receiver. A bit of data may also be transmitted when a pulse is generated in only one of the contacts in the bank 5. For example, when the card moving in the direction of the arrow is positioned so that the single opening 45 is opposite the bank of contacts, more particularly, when it is opposite contact $B_2$, a pulse will be generated only in contact $B_2$. When this occurs, oscillator B will transmit tone $B_2$, whereas oscillators A and C will transmit tones $A_0$ and $C_0$, respectively, and thus another bit of data is transmitted and represented by three different tones in the telephone line 43. It can be shown that by this system, 36 different bits of data can be transmitted each represented by three different tones, at least one of which is a rest tone, and during periods when no data is transmitted three different rest tones will be transmitted to saturate the receivers and squelch.

Figure 2:
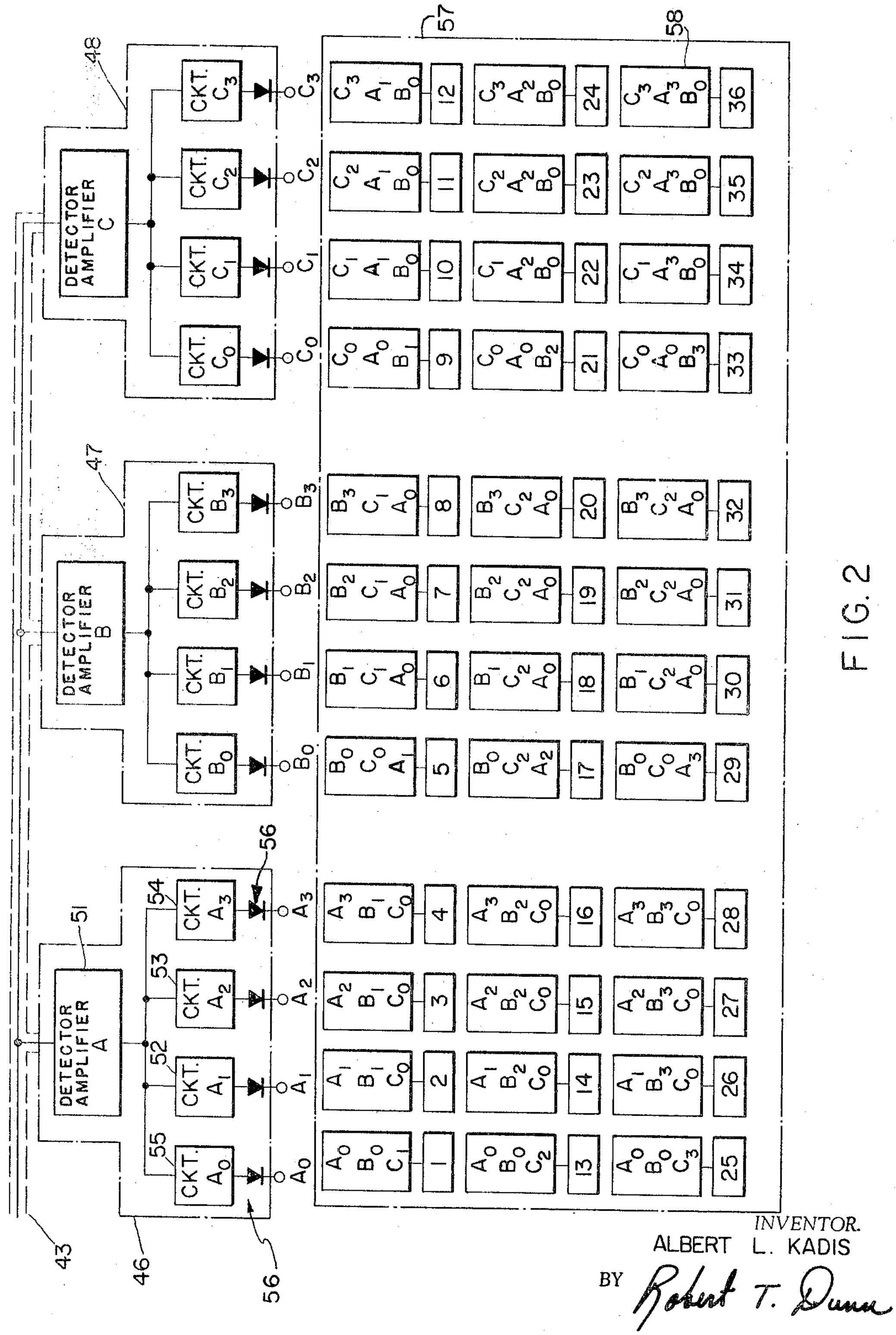
FIG. 2 illustrates receiver equipment at the other end of, for example, a telephone line for detecting the transmitted tones, decoding them and energizing apparatus for either punching duplicate cards or displaying the transmitted data.

Turning next to FIG. 2 there are shown three receiver circuits 46, 47 and 47 each coupled to the telephone line 43. Receiver circuit 46 includes, for example, a detector-amplifier 51 responsive to tones generated by the A oscillator 17 in the telephone line 43. Amplifier 51 feeds four tuned circuits $A_1$, $A_2$, $A_3$ and $A_0$ which are denoted 52–55. These tuned circuits couple to terminals $A_1$, $A_2$, $A_3$ and $A_0$ through diodes 56. Thus, when one of the tones $A_1$, $A_2$, $A_3$ or $A_0$ is present in the telephone line 43, a pulse will appear at the corresponding terminal $A_1$, $A_2$, $A_3$ or $A_0$.

Receiver circuits 47 and 48 are similar to circuit 46 and in a similar manner serve to produce pulses at terminals $B_1$, $B_2$, $B_3$ and $B_0$ and at terminals $C_1$, $C_2$, $C_3$ and $C_0$, respectively when the appropriate B or C tones are present in the telephone line 43.

The above-described series of A, B and C terminals which are energized when their corresponding tones are present in the telephone line 43 are coupled by means not shown to a logic circuit 57 which for purposes of example includes 36 AND gates such as AND gate 58, each of which responds to the signals in the terminals listed for each gate. The output of each of these AND gates controls a separate symbol of a display or a typewriter or a punch or combination of punches for punching a card. For simplicity, each of the separate symbols is represented by numbers 1–36 coupled to the output of one of the AND circuits. Thus, the combination of tones in the telephone line 43 are decoded provided there are the three required tones present in the line simultaneously. If, for example, it is intended to transmit a bit of data representing the number 36, the tones $A_3$, $C_3$ and $B_0$ are transmitted, and when detected produce pulses at the terminals $A_3$, $C_3$ and $B_0$ which in turn energize AND gate 58 which controls mechanism for recording or presenting the display of the number 36.

Figure 3:
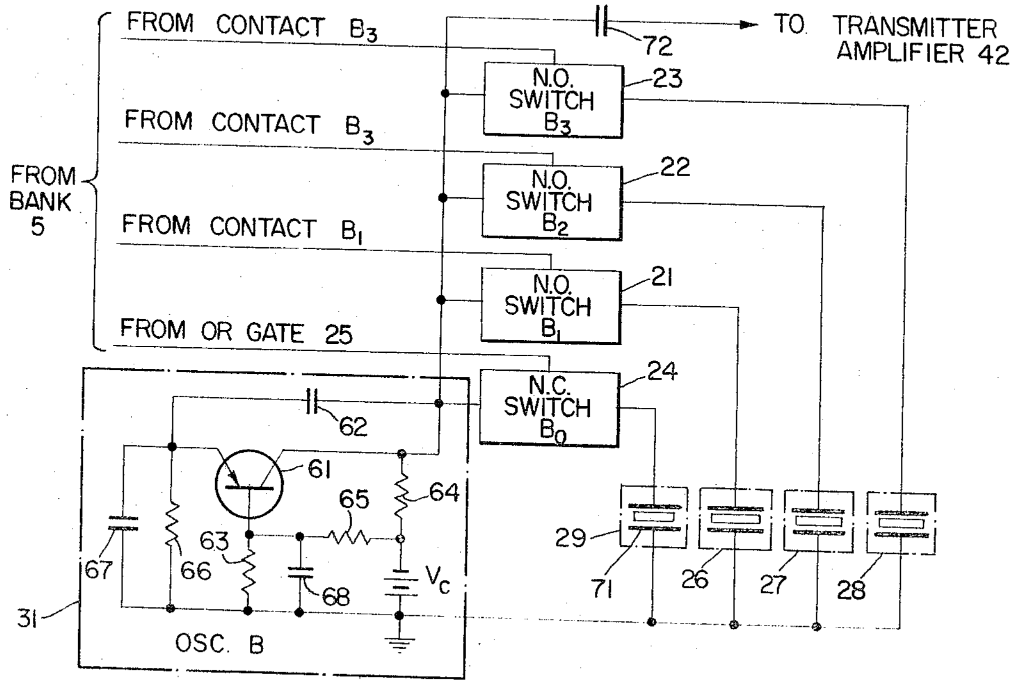
FIG. 3 is a cirruit diagram showing a typical one of the oscillators capable of generating four different frequencies in response to signals derived from a punched card.

FIG. 3 illustrates a typical one of the oscillators A, B and C, and associated switching mechanism under control of the signals generated in the contacts for coupling different tuned circuits to the oscillator to determine the output frequency from the oscillator. More particularly, FIG. 3 illustrates the details of oscillator B and associated switches. The oscillator B denoted 31 is, for example, a Colpitts-type crystal oscillator employing a PNP semiconductor with collector-emitter regeneration. Feedback in the transistor 61 is provided from the collector to the emitter through a capacitance 62, and resistors 63 and 64 and 65 provided the proper biasing conditions for the circuit. Resistor 66 serves to swamp the emitter and capacitors 62 and 67 form a voltage divider connected across the output of the transistor, while capacitor 68 is an arc bypass around the base biasing resistor 63. A source $V_c$ biases the collector negative with respect to the base. The oscillating frequency of this circuit is determined by one of the tuned circuits 26–29 which is coupled across the base and collector by operation of the switches 21–24. Switches 21–23 are normally open, and switch 24 is normally closed when there are no pulses generated in contacts $B_1$ to $B_3$ of the bank 5. Thus, in this condition the crystal 71 in circuit 29 determines the output frequency of the oscillator appearing in capacitance 72. The oscillating frequency is determined not only by the crystal but also by the parallel capacitance offered by capacitances 62 and 68. These capacitances are normally made large to swamp both the input and output capacitances of the transistor and make oscillators comparatively independent of changes in the transistor. It should be clearly understood that the circuits shown in FIG. 3 are made only by way of example and illustrate a convenient and useful type oscillator coupled to a bank of crystals for producing the various tones $B_1$, $B_2$, $B_3$ and $B_0$. Other suitable types of oscillators and tuned circuits could be employed without deviating from the scope of the invention.

Figure 4:
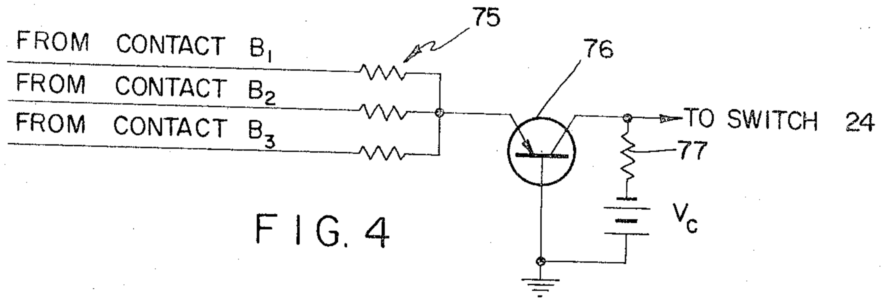
FIG. 4 illustrates an OR gate suitable for controlling a normally closed switch coupling an oscillator to a circuit tuned to a rest tone.

A typical one of the OR gates 12, 25 and 36 is illustrated in FIG. 4. For example, OR gate 25 is illustrated and includes three identical resistors 75 responsive to pulses generated in the contacts $B_1$, $B_2$ and $B_3$ so that when there is a pulse in any of these contacts, a similar pulse is produced at the output of the transistor across output resistor 77 and is applied to the normally closed switch 24 to open the switch and disconnect the crystal 71 from the B oscillator 31. At the same time, the pulse in contacts $B_1$, $B_2$ or $B_3$ will close one of the normally open switches 21, 22 or 23 connecting one of the tuned circuits 26, 27 or 28 to the B oscillator.

Figure 5:
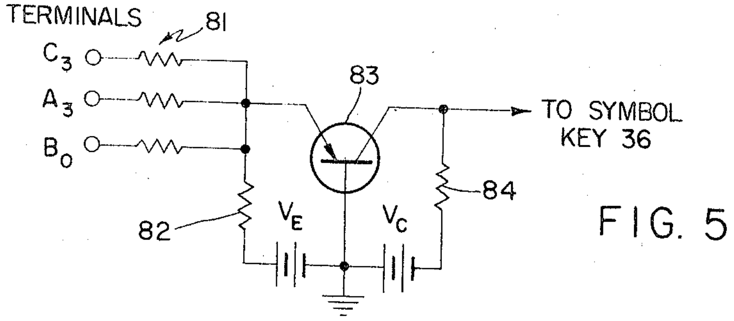
FIG. 5 illustrates an AND gate such as used in the receiver logic circuit for detecting a given bit of transmitted data and energizing a display mechanism or apparatus for punching a card.

A typical one of the AND gates in the logic circuit 57 is illustrated in FIG. 5. For example, AND gate 58 which couples to the terminals $A_3$, $C_3$ and $B_0$ is illustrated. The terminals $A_3$, $C_3$ and $B_0$ are each connected through identical resistors 81 to a resistor 82 which is in series with biasing source $V_e$ and which combines with this source to bias the emitter with respect to the base of a transistor 83. Normally, when there are no pulses or pulses at only one or two of the terminals $A_3$, $C_3$ and $B_0$, saturating currents flow between the emitter and collector of the transistor 83, and the output across resistor 84 remains substantially at ground potential. However, when pulses are present in all three terminals $A_3$, $C_3$ and $B_0$, this situation is altered, and no current flows in resistor 84 so that an output pulse at voltage $V_c$ is produced and is applied to the mechanism for energizing the symbol 36.

This completes the description of one embodiment of the present invention including transmitter equipment for transmitting combinations of tones, each different combination representing a different bit of data and for transmitting another combination of tones during rest periods so that receiver equipment responsive to the tones is saturated during the rest periods to squelch spurious reflections or noise and makes use of some tones to transmit data and also during rest periods. The embodiment of the invention is adapted to generate, transmit, receive and decode information over a telephone system; however, the principles involved are applicable to other systems for transmitting information from one place to another, and other types of circuitry for providing gating, switching and frequency generating operations described may be substituted without deviating from the spirit and scope of the invention as set forth in the accompanying claims.

What is claimed is:

1. A data transmission system comprising:

a card having openings punched therein, different groups of two openings representing different bits of information;

means for sequentially detecting each group of openings and producing first signals representative of the openings in said detected group;

means including nine normally open switches each connected to a different one of nine tuned circuits and responsive to said signals for simultaneously generating two different data signals produced by two of said tuned circuits when two of said normally open switches close in response to two of said signals;

means coupled to said first-mentioned means including three OR gates each responsive to any one of three of said first signals and connected to a different normally closed switch connected to a tuned circuit for generating, simultaneously with said data signals, one of three different rest signals produced by one of said tuned circuits when one of said OR gates receives none of said signals and is nonconductive and the connected switch remains closed and for generating said three rest signals during periods when no data signals are generated; and, means for transmitting said simultaneously generated data and rest signals representing bit information and for transmitting said three rest signals during periods when no data signals are transmitted to squelch undesired signals.

2. A data transmission system comprising:

a source of information signals;

means including a plurality of normally open switches each connected to a different first tuned circuit and responsive to said information signals for generating at least one data signal produced by at least one of said tuned circuits when at least one of said normally open switches closes in response to at least one of said information signals;

means coupled to said source including a plurality of OR gates each responsive to any one of a plurality of different information signals and connected to a different normally closed switch connected to a second tuned circuit for generating at least one rest signal simultaneously with said at least one data signal produced by at least one of said second tuned circuits when at least one of said OR gates receives none of said information signals and is nonconductive and the connected switches remain closed, and for generating all of the rest signals during periods when no data signals are generated; and, means for transmitting said simultaneously generated data and rest signals representing information and for transmitting all of said rest signals during periods when no data signals are transmitted to squelch undesired signals.

3. A data transmission system comprising:

a source of information signals;

means including a plurality of normally open switches each connected to a different first tuned circuit and responsive to said information signals for generating two data signals produced by two tuned circuits when two of said normally open switches close in response to two of said information signals;

means coupled to said source including a plurality of OR gates each responsive to any one of a plurality of different information signals and connected to a different normally closed switch connected to a second tuned circuit for generating one rest signal simultaneonsly with said two data signals produced by one of said second tuned circuits when one of said OR gates receives none of said information signals and is nonconductive and the connected switch remains closed, and for generating all of the rest signals during periods when no data signals are generated; and, means for transmitting said simultaneously generated data and rest signals representing information and for transmitting all of said rest signals during periods when no data signals are transmitted to squelch undesired signals.

4. A data transmission system comprising:

a source of information signals;

means including a plurality of normally open switches each connected to a different first tuned circuit and responsive to said information signals for generating a data signal produced by a tuned circuit when one of said normally open switches closes in response to one of said information signals;

means coupled to said source including a plurality of OR gates each responsive to any one of a plurality of different information signals and connected to a different normally closed switch connected to a second tuned circuit for generating two rest signals simultaneously with said data signal produced by two of said second tuned circuits when two of said OR gates receives none of said information signals and are nonconductive and the connected switches remain closed, and for generating all of the rest signals during periods when no data signals are generated; and, means for transmitting said simultaneously generated data and rest signals representing information and for transmitting all of said rest signals during periods when no data signals are transmitted to squelch undesired signals.

5. A data transmission system comprising:

means for storing bits of information, each bit being represented by at least one irregularity in a substantially smooth surface;

means for simultaneously detecting all irregularities representing such a bit and producing information signals;

means including a plurality of normally open switches each connected to a different first tuned circuit and responsive to said information signals for generating at least one data signal produced by at least one of said tuned circuits when at least one of said normally open switches closes in response to at least one of said information signals;

means coupled to said second-mentioned means including a plurality of OR gates each responsive to any one of a plurality of different information signals and connected to a different normally closed switch connected to a second tuned circuit for generating at least one rest signal simultaneously with said at least one data signal produced by at least one of said second tuned circuits when at least one of said OR gates receives none of said information signals and is nonconductive and the connected switches remain closed, and for generating all of the rest signals during periods when no data signals are generated; and, means for transmitting said simultaneously generated data and rest signals representing information and for transmitting all of said rest signals during periods when no data signals are transmitted to squelch undesired signals.

6. A data transmission system comprising:

a card having openings punched therein, different groups of openings representing different bits of information;

means for sequentially detecting each group of openings and producing information signals representative of the openings in said detected group;

means including a plurality of normally open switches each connected to a different first tuned circuit and responsive to said information signals for generating at least one data signal produced by at least one of said tuned circuits when at least one of said normally open switches closes in response to at least one of said information signals;

means coupled to said first-mentioned means including a plurality of OR gates each responsive to any one of plurality of different information signals and connected to a different normally closed switch connected to a second tuned circuit for generating at least one rest signal simultaneously with said at least one data signal produced by at least one of said second tuned circuits when at least one of said OR gates receives none of said information signals and is nonconductive and the connected switches remain closed, and for generating all of the rest signals during periods when no data signals are generated; and, means for transmitting said simultaneously generated data and rest signals representing information and for transmitting all of said rest signals during periods when no data signals are transmitted to squelch undesired signals.

7. A data transmission system comprising:

a source of information signals;

means including a plurality of normally open switches each connected to a different first tuned circuit and responsive to said information signals for generating at least one data signal produced by at least one of said tuned circuits when at least one of said normally open switches closes in response to at least one of said information signals;

means coupled to said source including a plurality of OR gates each responsive to any one of a plurality of different information signals and connected to a different normally closed switch connected to a second tuned circuit for generating at least one rest signal simultaneously with said at least one data signal produced by at least one of said second tuned circuits when at least one of said OR gates receives none of said information signals and is nonconductive and the connected switches remain closed, and for generating all of the rest signals during periods when no data signals are generated; and, means for transmitting said simultaneously generated data and rest signals representing information and for transmitting all of said rest signals during periods when no data signals are transmitted to squelch undesired signals;

means for receiving all of said transmitted signals;

and, means coupled to said receiving means for detecting different combinations of said simultaneously transmitted rest and data signals.

References Cited by the Examiner

UNITED STATES PATENTS

| | | | |
|---|---|---|---|
| 2,471,076 | 5/1949 | Moore | 178—80 X |
| 2,677,014 | 4/1954 | Moynihan | 179—84 |

DAVID G. REDINBAUGH, *Primary Examiner.*

J. T. STRATMAN, *Assistant Examiner.*

UNITED STATES PATENT OFFICE

CERTIFICATE OF CORRECTION

Patent No. 3,305,635 February 21, 1967

Albert L. Kadis

It is hereby certified that error appears in the above numbered patent requiring correction and that the said Letters Patent should read as corrected below.

Column 2, line 48, strike out "switches couple one of the tuned circuits 26-96$^{d}$a2611-p"; line 69, for "21 and 23" read -- 21 to 23 --; column 3, line 18, after "squelch" insert -- reflections. Accordingly, each of the rest tones saturates one of the receiver amplifiers during the periods when no data is being transmitted, and thus squelches reflections of data tones which may be circulating back and forth in the telephone line --.

Signed and sealed this 20th day of August 1968.

(SEAL)
Attest:

Edward M. Fletcher, Jr.
Attesting Officer

EDWARD J. BRENNER
Commissioner of Patents